United States Patent [19]
Yamamoto

[11] Patent Number: 5,936,748
[45] Date of Patent: Aug. 10, 1999

[54] IMAGE READING DEVICE WITH CONTROL OF RGB PIXEL DATA READING ORDER ACCORDING TO EFFECT BY OSCILLATION OF MOVING MECHANISM

[75] Inventor: Yasuhiro Yamamoto, Tokyo, Japan

[73] Assignee: Asahi Kogaku Kogyo Kabushiki Kaisha, Tokyo, Japan

[21] Appl. No.: 08/922,320

[22] Filed: Sep. 3, 1997

[30] Foreign Application Priority Data

Sep. 6, 1996 [JP] Japan ..................... 8-257845

[51] Int. Cl.$^6$ ..................... H04N 1/46
[52] U.S. Cl. ............... 358/504; 358/506; 250/208.1
[58] Field of Search ................... 358/504, 406, 358/413; 250/208.1, 234, 235, 236; 382/318, 319; 348/96, 97, 98, 99, 100, 101, 102, 103, 104, 105, 106, 107, 108, 109, 110, 111, 112; 359/201

[56] References Cited

U.S. PATENT DOCUMENTS 5,696,608 12/1997 Matsuo et al. ..................... 358/475
5,734,759 3/1998 Hirota et al. ..................... 382/274
5,825,522 10/1998 Takano et al. ..................... 359/201
5,828,479 10/1998 Takano et al. ..................... 359/201

*Primary Examiner*—Jon Chang
*Assistant Examiner*—Vikkram Bali
*Attorney, Agent, or Firm*—Greenblum & Bernstein, P.L.C.

[57] ABSTRACT

The image reading device has a moving mechanism by which a stage, supporting a read object in which a color image is recorded, is intermittently moved so that the color image is read by a line sensor. In a stopping operation during the intermittent movement, the stage passes slightly over the stop position, and then reverses. Thus, the stage oscillates about the stop position. Substantially simultaneously with the stopping operation, i.e., while the stage is still oscillating, a blue light-emitting diode is turned ON, so that B pixel data is sensed by the line sensor. During this sensing operation of the B pixel data, the oscillation of the stage is fully damped. Then, the B light-emitting diode is turned OFF, and a red light-emitting diode is turned ON, so that R pixel data is sensed. Then, the R light-emitting diode is turned OFF, and a green light-emitting diode is turned ON, so that G pixel data is sensed.

12 Claims, 13 Drawing Sheets

IMAGE READING DEVICE WITH CONTROL OF RGB PIXEL DATA READING ORDER ACCORDING TO EFFECT BY OSCILLATION OF MOVING MECHANISM

BACKGROUND OF THE INVENTION

1. Field of the Invention

The present invention relates to an image reading device in which a light beam of red, green or blue is radiated onto a color image recorded in a film, for example, so that the color image is read.

2. Description of the Related Art

Conventionally, there is known an image reading device in which a film is intermittently moved along a sub-scanning direction perpendicular to a main-scanning direction, which is a longitudinal direction of a line sensor, so that red (R) pixel data, green (G) pixel data and blue (B) pixel data are read at every single line of image pixels included in a color image recorded in the film. Namely, at every reading operation of the single line of image pixels, the film is moved by a predetermined amount, by a moving mechanism, and a light beam of R, G or B is selectively radiated onto the film while the film is stopped, so that R, G and B pixel data are sensed by the line sensor.

During the intermittent movement, immediately after the stopping operation of the moving mechanism, an oscillation occurs due to a reason related to the structure of the moving mechanism. If the reading operation by the line sensor is started before the oscillation is fully damped, the pixel data cannot be sensed with a high accuracy, and thus, the quality of the reproduced image would be low. Therefore, in a conventional device, the reading operation is started after the oscillation is fully damped, which causes a protracted reading operation time.

SUMMARY OF THE INVENTION

Therefore, an object of the present invention is to shorten a time necessary for the reading operation without lowering the quality of an image reproduced from a recording medium.

According to the present invention, there is provided an image reading device for performing an image reading operation in which at least one of a line sensor or a recording medium is intermittently moved by a moving mechanism in a direction perpendicular to the longitudinal direction of the line sensor, so that red (R) pixel data, green (G) pixel data and blue (B) pixel data are read at every single line of image pixels included in a color image recorded in the recording medium. The device comprises a pre-scanning processor and a controlling processor.

The pre-scanning processor controls the moving mechanism, prior to the image reading operation, to pre-scan the color image by the line sensor, whereby R, G and B pixel data are obtained. The controlling processor controls an order in which the R, G and B pixel data are read in the image reading operation; the controlling processor determining, based on the pixel data obtained by the pre-scanning processor, which pixel data among the R, G and B pixel data is least affected by an oscillation due to a stopping operation during an intermittent movement by the moving mechanism, and controlling the order so that the pixel data, which is least affected by the oscillation, is read substantially simultaneously with the stopping operation.

Further, according to the present invention, there is provided an image reading device comprising a pre-scanning processor and a controlling processor. The pre-scanning processor has the same construction described above. The controlling processor controls an order in which the R, G and B pixel data are read in the image reading operation; the controlling processor determining, based on the pixel data obtained by the pre-scanning processor, which pixel data among the R, G and B pixel data is least affected by an oscillation due to a stopping operation during an intermittent movement by the moving mechanism, and controlling the order so that the pixel data, which is least affected by the oscillation, is read first in comparison with the other pixel data.

Still further, according to the present invention, there is provided an image reading device comprising an optical sensor, a moving mechanism, a pre-scanning processor, a scanning processor and a controlling processor.

The moving mechanism intermittently moves either the optical sensor or the recording medium in a predetermined direction so that the optical sensor reads the R, G and B pixel data at every single line of image pixels included in the color image. The pre-scanning processor drives the moving mechanism to pre-scan the color image by the optical sensor with a first pitch, whereby the R, G and B pixel data are obtained. The scanning processor drives the moving mechanism to scan the color image by the optical sensor with a second pitch, finer than the first pitch, whereby the R, G and B pixel data are obtained. The controlling processor controls the scanning processor so that the R, G and B pixel data of the single line of image pixels are read by the optical sensor in a predetermined order; the controlling processor determining, based on the pixel data obtained by the pre-scanning processor, which pixel data among the R, G and B pixel data is least affected by an oscillation due to a stopping operation during an intermittent movement by the moving mechanism, and controlling the order so that the pixel data, which is least affected by the oscillation, is read substantially simultaneously with the stopping operation.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
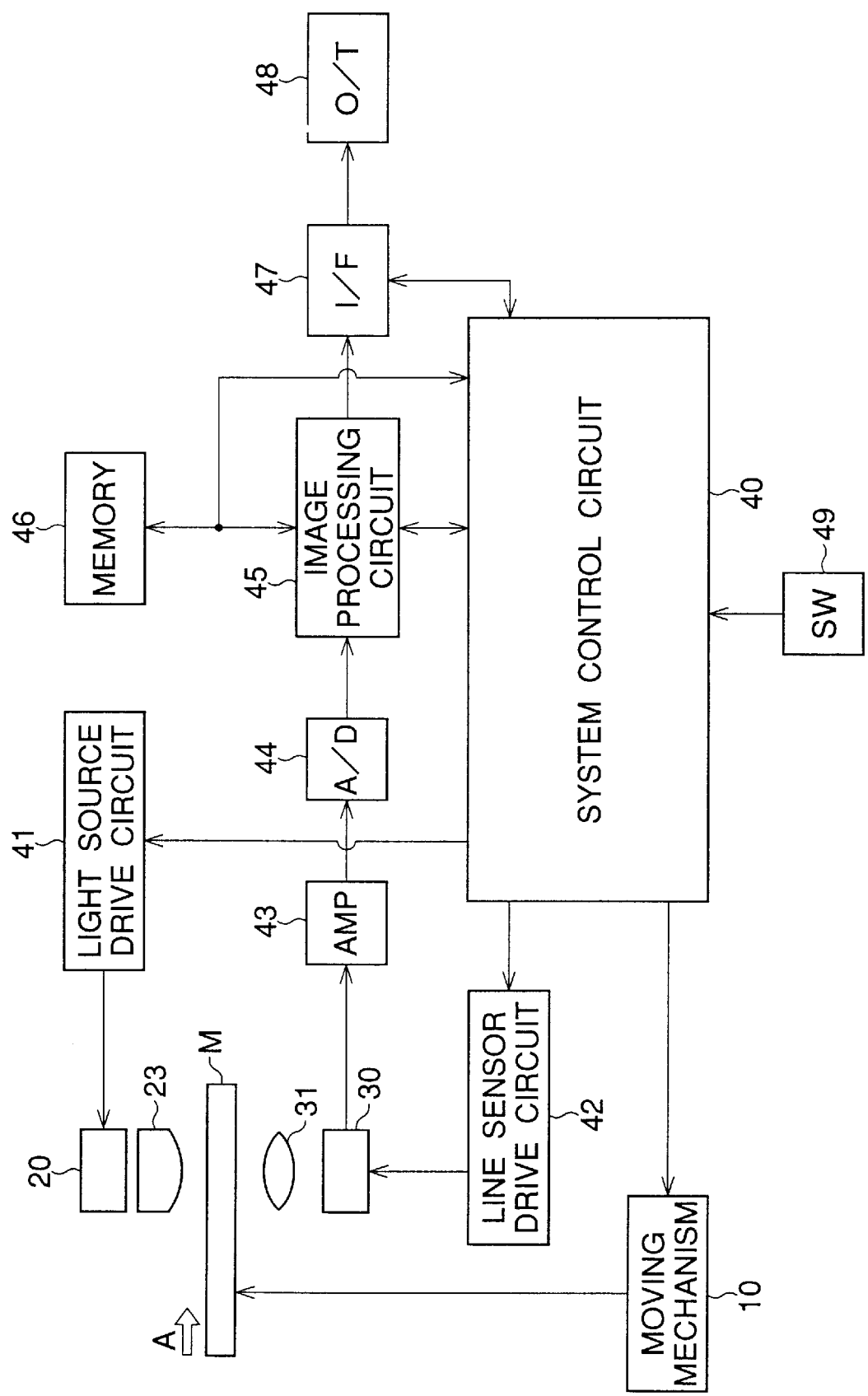
FIG. 1 is a block diagram showing an electrical structure of an image reading device of a first embodiment of the present invention.

The present invention will be described below with reference to embodiments shown in the drawings.

FIG. 1 shows an electrical structure of an image reading device of a first embodiment of the present invention.

A read object M, handled by this image reading device, is a transparent film in which a color image has been recorded. The read object M is intermittently moved along a direction shown by an arrow A, by a moving mechanism 10.

A light source 20 and a cylindrical lens 23, provided below the light source 20, are disposed above a passage through which the read object M is moved. A line sensor 30 and a forming lens 31, provided above the line sensor 30, are disposed under the passage. The light source 20 is connected to a light source drive circuit 41, so that the light source 20 can be turned ON and OFF. The line sensor 30 is connected to a line sensor drive circuit 42, so that the color image can be read by the line sensor 30. The moving mechanism 10, the light source drive circuit 41 and the line sensor drive circuit 42 are controlled in accordance with a command signal outputted by a system control circuit 40.

The line sensor 30 is provided with a plurality of photo-diodes, which are aligned rectilinearly, whereby an electric signal, corresponding to the amount of light received by the photo-diode, is generated in each of the photo-diodes. The electric signal (i.e., the pixel data), read through the line sensor 30, is amplified by an amplifier 43 and is converted to a digital signal by an A/D converter 44. The digital pixel data is subjected to an image process, such as a shading correction, in an image processing circuit 45, and is then stored in a memory 46.

The pixel data, subsequent to being read from the memory 46, is subjected to a calculation process, such as a color correction and a gamma correction. Then, the pixel data is converted to a signal, which conforms with a predetermined format, by an interface circuit 47, and is outputted to an external computer (not shown) through an output terminal 48. The image processing circuit 45 and the interface circuit 47 are controlled by the system control circuit 40.

A switch 49 is connected to the system control circuit 40, so that various kinds of operations can be performed.

Figure 2:
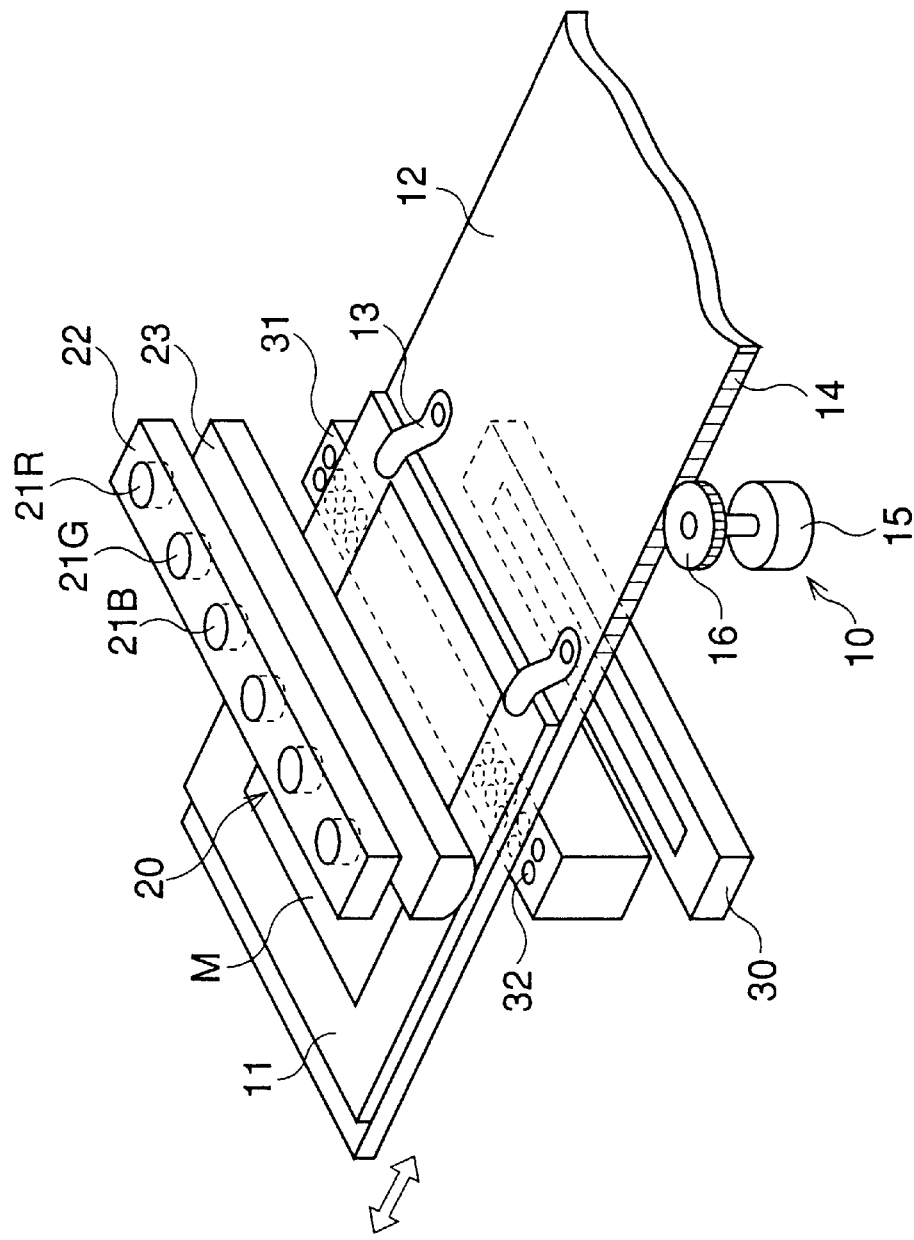
FIG. 2 is a perspective view showing a moving mechanism, a light source and a line sensor.

FIG. 2 shows the moving mechanism 10, the light source 20 and the line sensor 30. The read object M is supported by a frame 11, which is fixed on a plate stage 12 by a fastener 13. An opening (not shown) is formed in the stage 12 at a position corresponding to the read object M, so that a light beam radiated onto the read object M can pass through the read object M. A rack 14 is formed on a side surface of the stage 12. A pinion 16 fixed on an output shaft of a feeding motor 15 is meshed with the rack 14. The feeding motor 15, which is a stepping motor, for example, is driven under control of the system control circuit 40, so that the position and the moving speed of the read object M are controlled.

The light source 20, positioned above the stage 12, is provided with light-emitting diodes 21R, 21G and 21B, which radiate R(red), G(green) and B(blue) light beams, respectively. Note that, although only six light-emitting diodes are shown in FIG. 2, more light-emitting diodes may be provided. The light-emitting diodes 21R, 21G and 21B, supported by a slender support member 22 which extends in a breadth direction of the stage 12, are arranged in this order uniformly along the support member 22. The cylindrical lens 23, positioned between the support member 22 and the stage 12, is extended in parallel with the support member 22. Namely, light emitted by the light-emitting diodes 21R, 21G and 21B is condensed in the sub-scanning direction (i.e., a direction in which the stage 12 is moved), through the cylindrical lens 23, and is radiated onto the read object M.

The line sensor 30 is positioned under the light source 20, leaving a space therebetween, such that the stage 12 can be intervened between the light source 20 and the line sensor 30. The line sensor 30, the light source 20 and the cylindrical lens 23 are parallel to each other. Namely, the line sensor 30 is extended in a direction approximately perpendicular to a direction in which the read object M is moved. The forming lens 31 is provided between the line sensor 30 and the stage 12. The forming lens 31, composed of a rod lens array 32, is extended parallel to the line sensor 30. Accordingly, when a light beam is emitted onto the read object M, by the light source 20, the image recorded in the read object M is formed on the light receiving surface of the line sensor through the forming lens 31.

Figure 3:
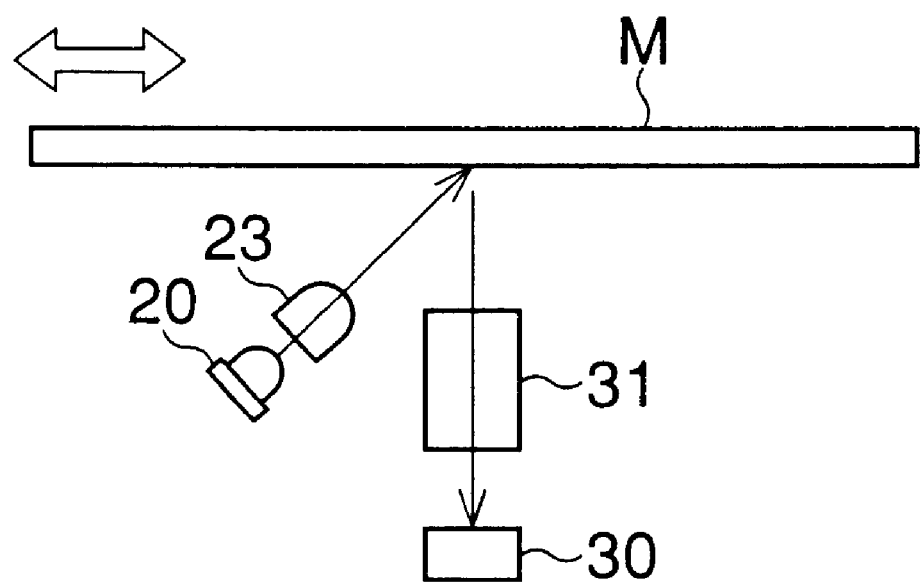
FIG. 3 is a view showing another structure of the light source and the line sensor, which are used when a read object reflects a light beam emitted by the light source.

FIG. 3 shows another structure of the light source 20 and the line sensor 30, in a case in which the read object M is not a transparent film, but reflects a light beam emitted by the light source 20. In this device, the light source 20, the cylindrical lens 23, the line sensor 30 and the forming lens 31 are disposed under the read object M. Namely, light emitted by the light source 20 is radiated onto the under surface of the read object M, and the reflected light is directed onto the line sensor 30 through the forming lens 31.

Prior to the image reading operation, in which the color image recorded in the read object M is read, a pre-scanning operation is carried out. Namely, an end of the read object M is set to an initial position facing the light source 20. Then, the read object M is intermittently moved, so that the color image is read by the line sensor 30 with a first pitch, which is coarser than a second pitch with which the image reading operation is carried out.

In the pre-scanning operation, the light-emitting diodes 21R, 21G and 21B are selectively turned ON in a predetermined order every time the stage 12 is stopped, so that R(red), G(green) and B(blue) pixel data are sensed at every single line of image pixels included in the color image recorded in the read object M. The read pixel data are stored in the memory 46. The pixel data, subsequently read from the memory 46, can be used for, example, indicating the image on a display device of an external computer, or for a trimming process by which unnecessary edge portions of the image are cut away. Pixel data, which are stored in the memory 46 and correspond to the center portion of the color image recorded in the read object M, are used for determining an order in which the light-emitting diodes 21R, 21C and 21B are turned ON in the image reading operation.

After the pre-scanning operation, the image reading operation is started. First, based on the R, G and B pixel data obtained by the pre-scanning operation, the order, in which the light-emitting diodes 21R, 21G and 21B are turned ON, is determined. Then, the read object M is again set to the initial position, where the light-emitting diode 21B, for example, is turned ON, so that a single line's worth of B pixel data is read by the line sensor 30. After this reading operation, the light-emitting diode 21B is turned OFF, and the B pixel data is read from the line sensor 30. Then, the light-emitting diode 21R is turned ON, and thus a single line's worth of R pixel data is obtained. Similarly, after the light-emitting diode 21R is turned OFF and the R pixel data is read from the line sensor 30, the light-emitting diode 21G is turned ON, and a single line's worth of G pixel data is obtained.

Thus, after each single line's worth of the R, G and B pixel data has been sensed, the stage 12 is moved by a predetermined amount, and is set to the next reading position. At this position, similar to the above described image reading operation, the light-emitting diodes 21R, 21G and 21B are selectively turned ON, so that R, G and B pixel data are again sensed.

By such movement of the stage 12 and the reading operation by the line sensor 30 being carried out alternatively, one frame's worth of pixel data are read. The order, in which the light-emitting diodes 21R, 21G and 21B are selectively turned ON in the image reading operation, i.e., the order, in which the R, G and B pixel data are read, is controlled, based on the pixel data obtained in the pre-scanning operation, so that pixel data from among the R, G and B pixel data, which is least affected by an oscillation due to a stopping operation during the intermittent movement by the moving mechanism 10, is read first, as described later with reference to FIGS. 4 and 5. Namely, the reading operation for the pixel data, which is hardly affected by the oscillation, is started before the oscillation is fully damped. Therefore, it is determined which pixel data, from among the R, G and B pixel data, is hardly affected by the oscillation, before the image reading operation is started. The determination will be described later.

Figure 4:
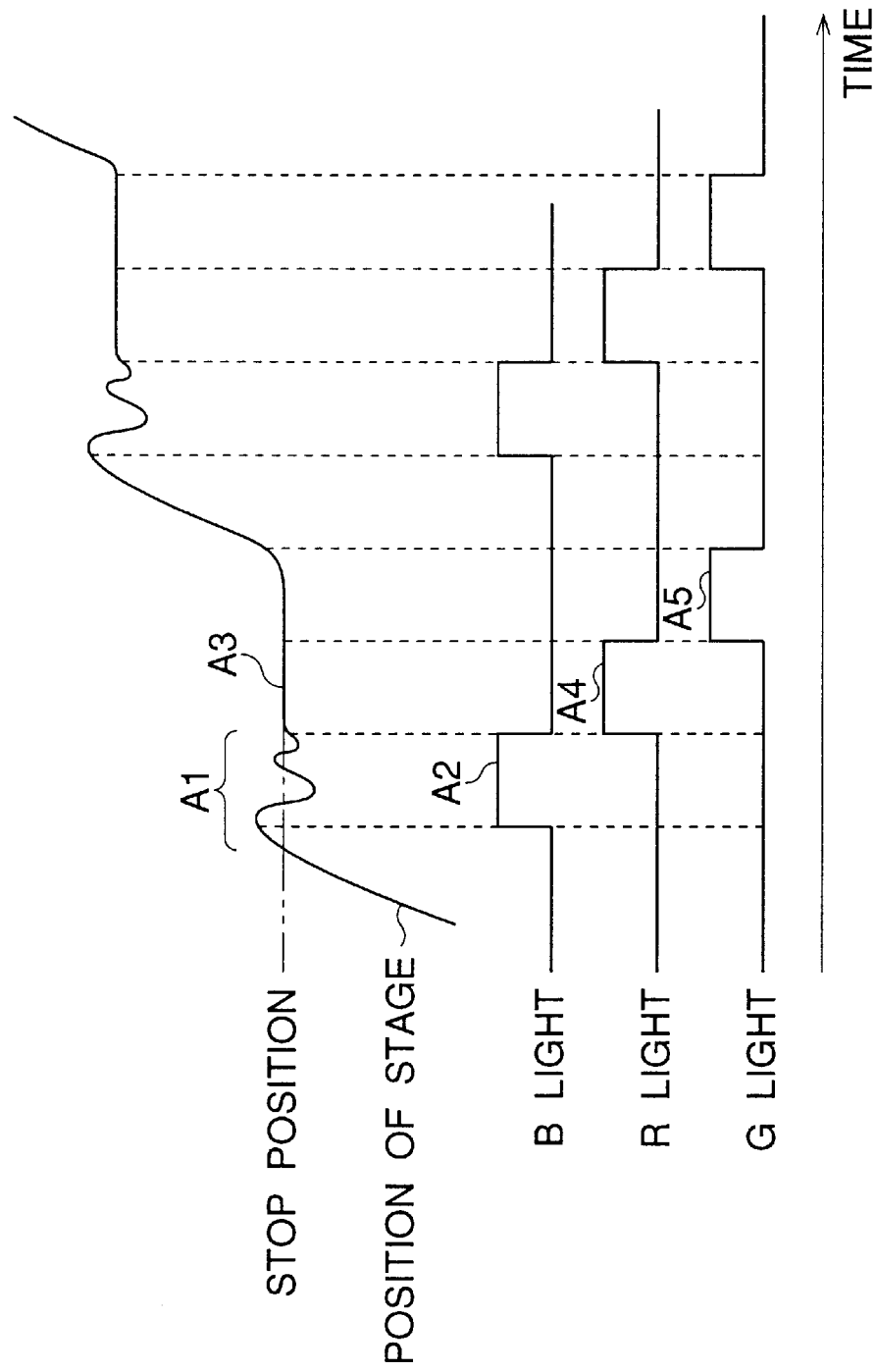
FIG. 4 is a timing chart indicating an image reading operation in the first embodiment.

FIG. 4 shows a timing chart indicating the image reading operation. In the example shown in FIG. 4, it is supposed that the B pixel data would be the least affected by the oscillation. Therefore, the light-emitting diodes 21B, 21R and 21G are turned ON in this order, which is determined based on the pixel data obtained by the pre-scanning operation, in accordance with a lighting order determination program shown in FIG. 7.

When the stage 12 is displaced and proximally reaches a predetermined position, the stage 12 is stopped by a brake mechanism (not shown). During this stopping operation, the stage 12 marginally passes beyond the stop position, and retreats slightly, so that the stage 12 oscillates about the stop position (reference A1). Substantially at the same time as the stopping operation, i.e., while the stage 12 is still oscillating, the light-emitting diode 21B is turned ON (reference A2), so that B pixel data is sensed. While the B pixel data is sensed, the oscillation of the stage 12 is fully damped (reference A3). Then, the light-emitting diode 21B is turned OFF, and the light-emitting diode 21R is turned ON (reference A4), so that R pixel data is sensed. Then, the light-emitting diode 21R is turned OFF, and the light-emitting diode 21G is turned ON (reference A5), so that G pixel data is sensed.

Thus, when the sensing operation of a single line's worth of the R, G and B pixel data has been completed, the stage 12 is moved by a predetermined amount, and is set to the next reading position. Then, similarly to the above, a single line's worth of pixel data are read in the order of B, R and G.

Figure 5:
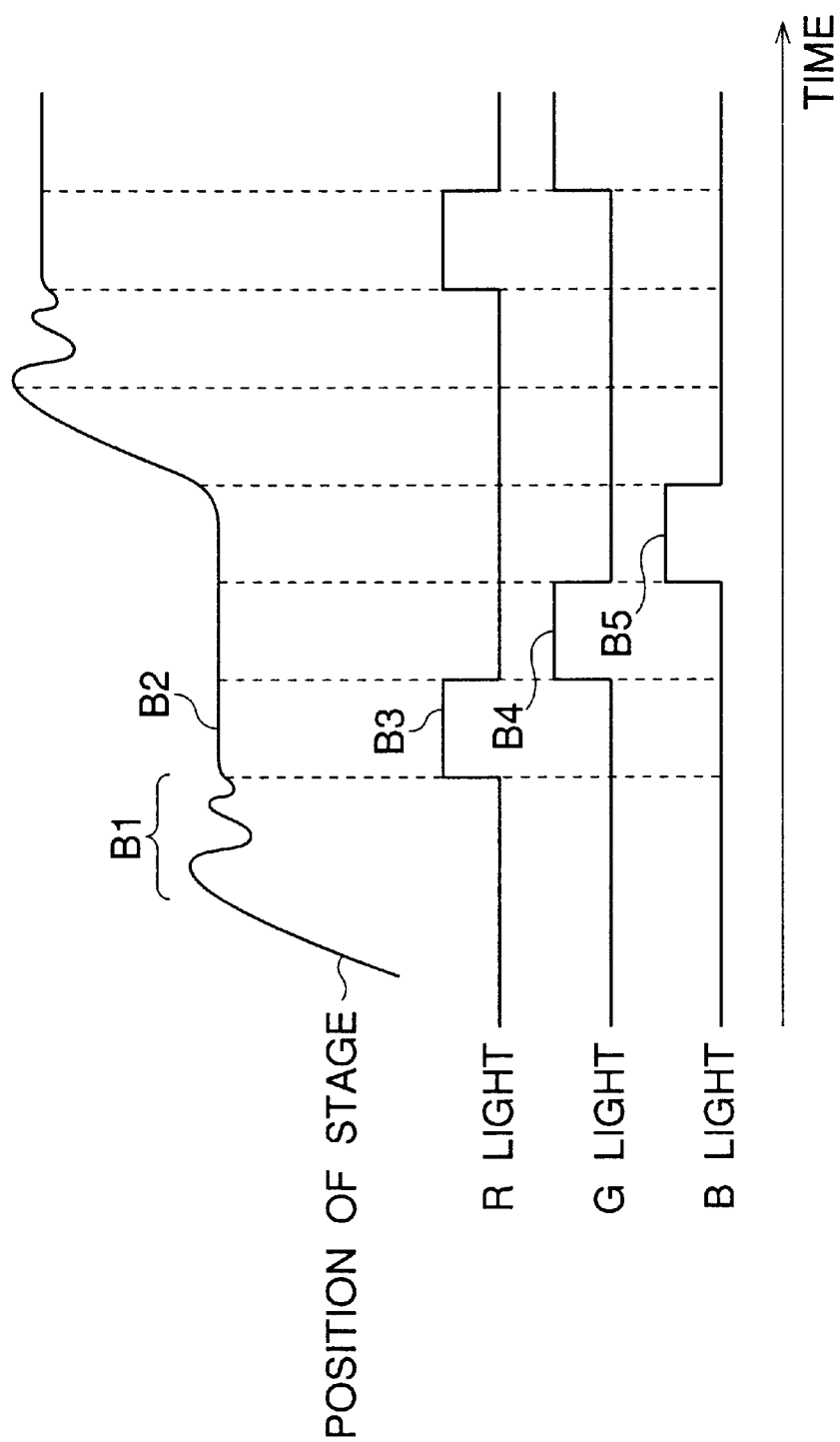
FIG. 5 is a timing chart indicating an image reading operation in a compared example.

FIG. 5 shows an example of a comparable image reading operation of pixel data. In this example, while the stage 12 is oscillating during the stopping condition (reference B1), the light-emitting diodes are not operated. After the oscillation is fully damped (reference B2), the light-emitting diode 21R is turned ON (reference B3), so that R pixel data is sensed. Then, the light-emitting diode 21R is turned OFF, and the light-emitting diode 21G is turned ON (reference B4), so that G pixel data is sensed. Then, the light-emitting diode 21G is turned OFF, and the light-emitting diode 21B is turned ON (reference B5), so that B pixel data is sensed.

As understood from comparing FIGS. 4 and 5, the reading operation of FIG. 4, in which the B pixel data is read, is started before the oscillation of the stage 12 is fully damped in the first embodiment, while the compared reading operation of FIG. 5 is started after the oscillation is fully damped. Therefore, according to the first embodiment, the time for the image reading operation can be shortened by a time in which it takes the oscillation of the stage 12 to be stopped (i.e., a time shown by references A1 and B1).

As described above, in the example shown in FIG. 4, it is supposed that the B pixel data is hardly affected by the oscillation, in comparison with the G and R pixel data. The determination regarding the influence of the oscillation will be described below.

Figure 6:
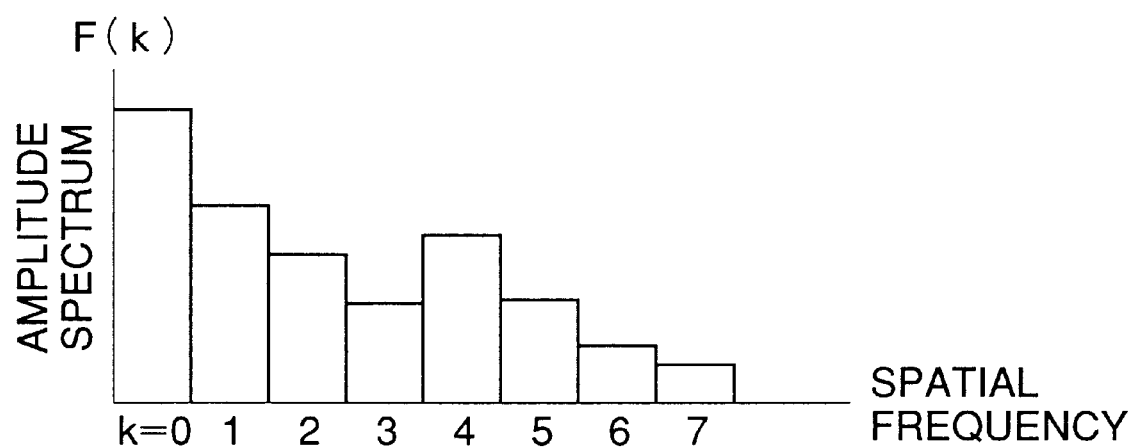
FIG. 6 is a view showing an amplitude spectrum of B pixel data, for example, obtained by a pre-scanning operation.

FIG. 6 shows an amplitude spectrum of the B pixel data, for example, obtained by pre-scanning the read object M, through the line sensor 30, while driving the moving mechanism 10. Namely, the abscissa axis indicates a spatial frequency of pixel data, and the ordinate axis indicates an amplitude F(k). The amplitude F(k) is defined as follows:

$$F(k) = \sum_{n=0}^{N-1} f(n)\omega^{nk} \qquad (1)$$

wherein $$\omega = e^{-j\frac{2\Pi}{N}},$$

"N" is a number of data, "n" is a position of the pixel, f(n) is "n"th pixel data, and $$0 \leq k \leq \frac{N}{2} - 1.$$

As an example of a method, based on the amplitude spectrum as shown in FIG. 6, by which it is determined whether the pixel data is hardly affected by the oscillation, an amount of an arithmetic mean "m", which is obtained according to the following equation, is used:

$$m = \frac{\sum_{k=0}^{\frac{N}{2}-1} F(k) \times k}{\sum_{k=0}^{\frac{N}{2}-1} F(k)} \qquad (2)$$

It can be deemed that the spatial frequency of the pixel data decreases as the value of the arithmetic mean "m" decreases. Therefore, even if the stage 12 oscillates while the pixel data is being sensed by the line sensor 30, the influence of the oscillation on the sensing accuracy of the pixel data is negligible. Namely, it is deemed that pixel data, having a relatively low spatial frequency, is hardly affected by the oscillation.

As described with reference to FIG. 4, when it is determined, for example, that the B pixel data is hardly affected by the oscillation in comparison with the R and G pixel data, even if the B pixel data is sensed simultaneously with the stopping operation of the moving mechanism 10, i.e., even if oscillation components are superimposed on the B pixel data, the quality of the reproduced image indicated on a display device is not lowered.

As described above, the first embodiment is constructed in such a manner that the pixel data of a color component, which is hardly affected by the oscillation, is read before the oscillation of the stage 12 is fully damped. Therefore, the time for reading the pixel data is shortened by a time for which it takes the oscillation of the stage 12 to be stopped, and further, the quality of the reproduced image is not lowered.

Figure 7:
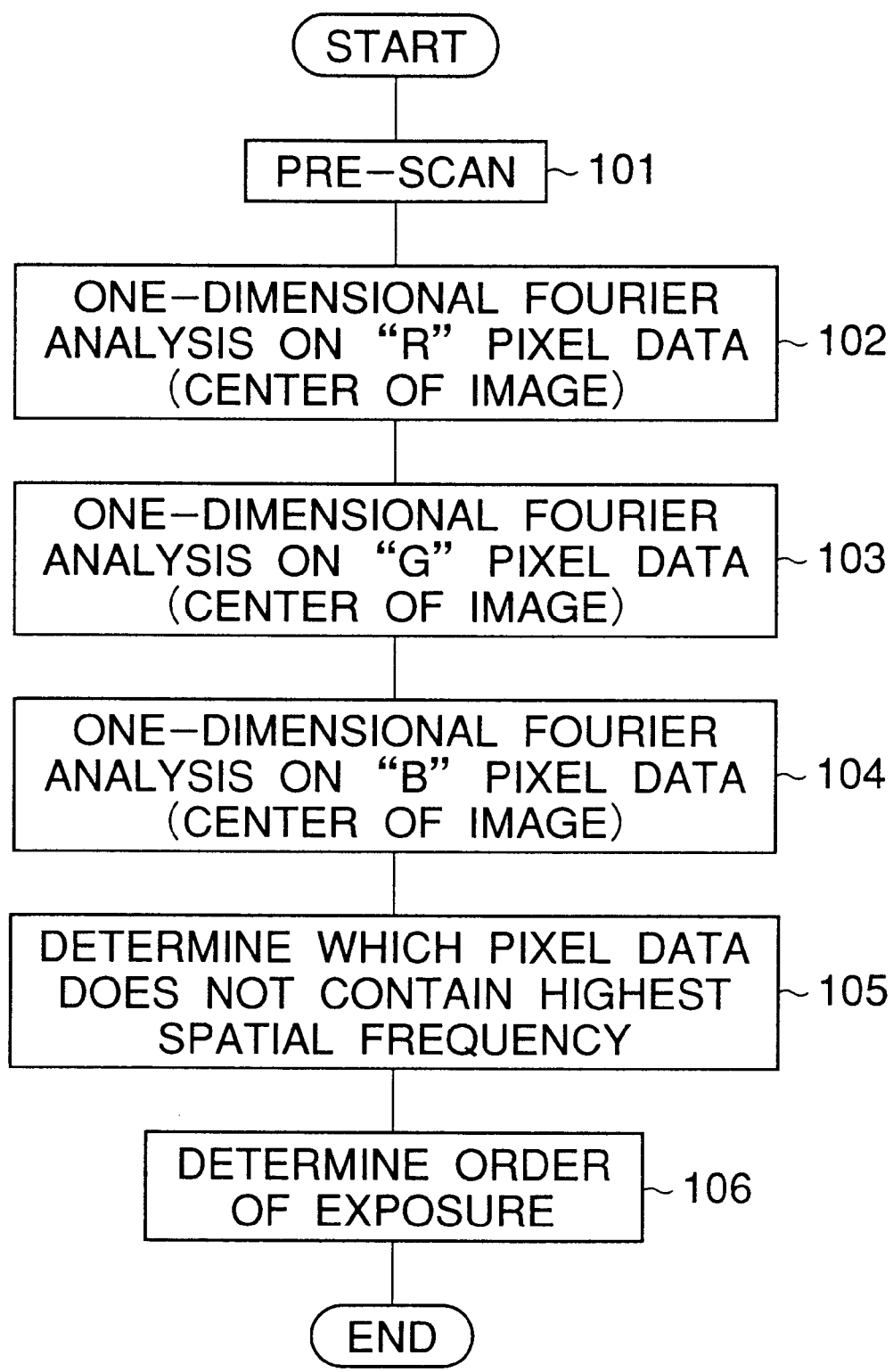
FIG. 7 is a flow chart of a program by which the order, in which the light-emitting diodes are selectively turned ON, is determined in the first embodiment.

FIG. 7 shows a flow chart of a program by which the order, in which the light-emitting diodes 21R, 21G and 21B are selectively turned ON to expose the read object M, is determined.

In Step 101, the pre-scanning operation is performed so that pixel data are sensed. Namely, while the read object M is stopped, the light-emitting diodes 21R, 21G and 21B are selectively turned ON in a predetermined order, and thus, R, G and B pixel data are sensed. The pre-scanning operation is a sensing operation, which is carried out with a pitch coarser than that of the image reading operation which is performed after the pre-scanning operation.

In Step 102, pixel data corresponding to the center portion of the image is extracted from the R pixel data sensed in Step 101, and a one-dimensional Fourier analysis is performed on the extracted pixel data, so that the amplitude F(k), expressed by the equation (1), is obtained for every spatial frequency. In steps 103 and 104, the amplitude F(k) is obtained for each of the G and B pixel data, similarly to Step 102.

In Step 105, by substituting the amplitudes F(k) obtained in Steps 102 through 104 into equation (2), the arithmetic mean "m" of the amplitude spectrum is obtained for each of the R, G and B pixel data. Then, it is determined which pixel data among the R, G and B pixel data does not contain the highest spatial frequency. In Step 106, the order, in which the light-emitting diodes 21R, 21G and 21B are turned ON, is determined, according to the values of the arithmetic mean "m", from a lowest value arithmetic mean to a highest value arithmetic mean, which were obtained in Step 105. Namely, in the image reading operation, the light-emitting diodes 21R, 21G and 21B are selectively turned ON, in the order determined in Step 106, at every single line of image pixels included in the color image recorded in the read object M.

Figure 8A:
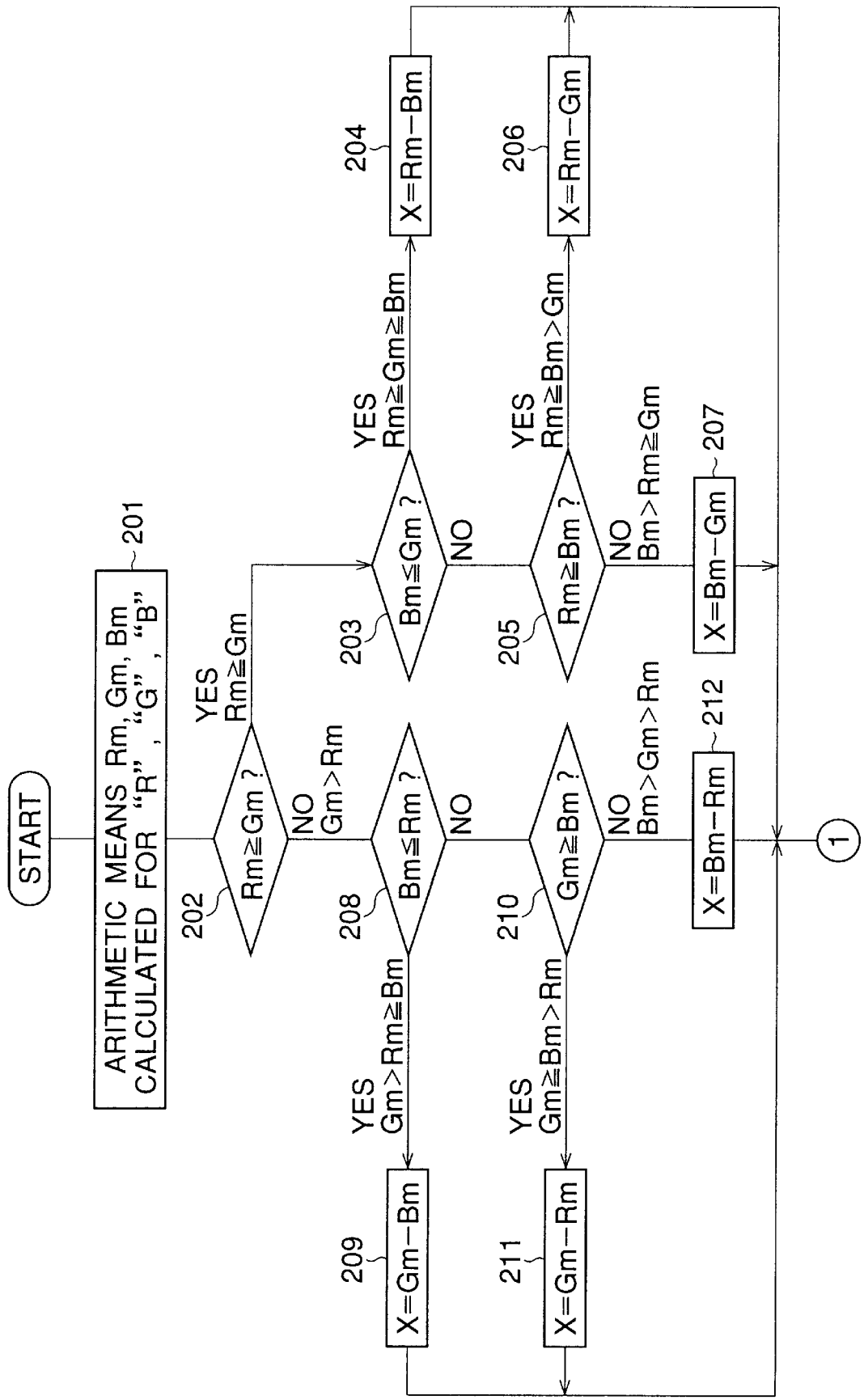
FIGS. 8A and 8B are a flow chart of a program by which the order, in which the light-emitting diodes are selectively turned ON, is determined in a second embodiment.
Figure 8B:
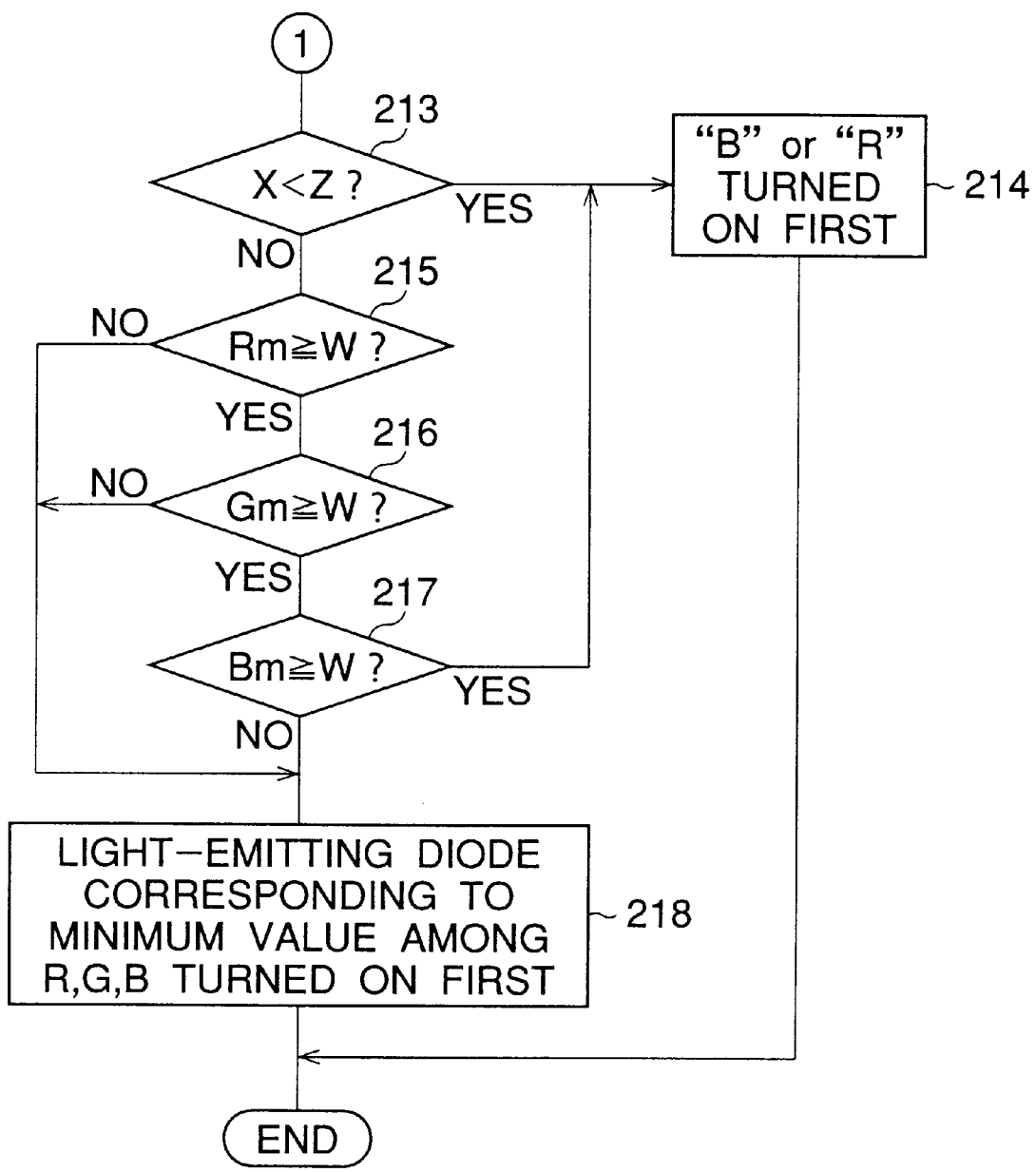

FIGS. 8A and 8B show a flow chart of a program by which the order, in which the light-emitting diodes 21R, 21G and 21B are selectively turned ON to expose the read object M, is determined, in a second embodiment. Note that, in the second embodiment, the construction of the device is the same as that of the first embodiment.

In Step 201, the processes executed in Steps 101 through 104 shown in FIG. 7 are carried out. Namely, the pre-scanning operation is carried out, so that R, G and B pixel data are sensed. Then, a Fourier analysis is performed regarding the pixel data corresponding to the center portion of the image, so that amplitudes F(k) are obtained. Thus, the arithmetic means Rm, Gm and Bm of the amplitude spectrum are obtained for each of the R, G and B pixel data.

In Steps 202 through 212, a difference X between a maximum value and a minimum value among the arithmetic means Rm, Gm and Bm is obtained. When Rm≧Gm≧Bm, Steps 202, 203 and 204 are executed in this order, so that the difference X is obtained as X=Rm−Bm. When Rm≧Bm>Gm, Steps 202, 203, 205 and 206 are executed in this order, so that the difference X is obtained as X=Rm−Gm. When Bm>Rm≧Gm, Steps 202, 203, 205 and 207 are executed in this order, so that the difference X is obtained as X=Bm−Gm. When Gm>Rm≧Bm, Steps 202, 208 and 209 are executed in this order, so that the difference X is obtained as X=Gm−Bm. When Gm≧Bm>Rm, Steps 202, 208, 210 and 211 are executed in this order, so that the difference X is obtained as X=Gm−Rm. When Bm>Gm>Rm, Steps 202, 208, 210 and 212 are executed in this order, so that the difference X is obtained as X=Bm−Rm.

In Step 213, it is determined whether the difference X is less than a reference value Z, which indicates a predetermined range. The reference value Z corresponds to a case in which the spatial frequencies of the R, G and B components, contained in the color image, have substantially the same values as each other. Namely, when the difference X is less than the reference value Z, it is deemed that the spatial frequency of each of the R, G and B components is substantially the same. In other words, it is determined that the R, G and B pixel data are affected to substantially the same extent.

Thus, Step 214 is executed in which either the R or B pixel data is sensed substantially simultaneously with the stopping operation of the moving mechanism 10. For example, the light-emitting diodes are turned ON in the order of B, R and G, if Bm is less than Rm, and the light-emitting diodes are turned ON in the order of R, B and G, if Rm is less than Bm. Namely, the G pixel data is sensed lastly among the R, G and B pixel data. Then, this program ends.

Conversely, when it is determined in Step 213 that the difference X is greater than or equal to the reference value Z, it is deemed that the spatial frequencies of the R, G and B components, contained in the image, are substantially different from each other, and that either one of these components is easily affected by the oscillation. In this case, Steps 215 through 218 are executed so that, in the image reading operation in which a single line of image pixels included in the color image is read, the light-emitting diode corresponding to the color which is least affected by the oscillation is turned on first, i.e., substantially simultaneously with the stopping operation of the moving mechanism.

In Step 215, it is determined whether the arithmetic mean Rm of the R component is greater than a threshold value W. When the arithmetic mean Rm is less than the threshold, Step 218 is executed, so that the light-emitting diodes corresponding to the color which has the minimum value among the arithmetic means Rm, Gm and Bm, are turned ON first in the image reading operation of the single line. Then, this program ends.

When it is determined in Step 215 that the arithmetic mean Rm is greater than or equal to the threshold value W, Step 216 is executed. When it is determined in Step 216 that the arithmetic mean Gm of the G component is less than the threshold value W, Step 218 is executed. Conversely, when it is determined that the arithmetic mean Gm is greater than or equal to the threshold value W, Step 217 is executed. When it is determined in Step 217 that the arithmetic mean Bm of the B component is less than the threshold value W, Step 218 is executed.

When it is determined in Step 217 that the arithmetic mean Bm is greater than or equal to the threshold value W, namely when the R, G and B pixel data would all be easily affected by the oscillation, Step 214 is executed, so that either the R or B pixel data is sensed substantially simultaneously with the stopping operation of the moving mechanism 10. Note that, since the B pixel data has less influence on the luminance signal, in comparison with the R pixel data, the B pixel data may be sensed first.

As described above, in the second embodiment, when the difference X between the minimum value and the maximum value among the arithmetic means Rm, Gm and Bm is not so large, either the B pixel data or the R pixel data is read first. Therefore, for example, when the arithmetic mean Gm of the G pixel data is slightly greater than the arithmetic mean of the other pixel data, the reading operation of the G pixel data is not carried out first. Namely, the G pixel data is read after the oscillation of the stage 12 has been damped as fully as possible, since the G pixel data has a greater influence on the quality of the reproduced image. Thus, according to the second embodiment, in addition to the effect obtained by the first embodiment, a deterioration of the quality of the reproduced image is surely prevented.

Figure 9:
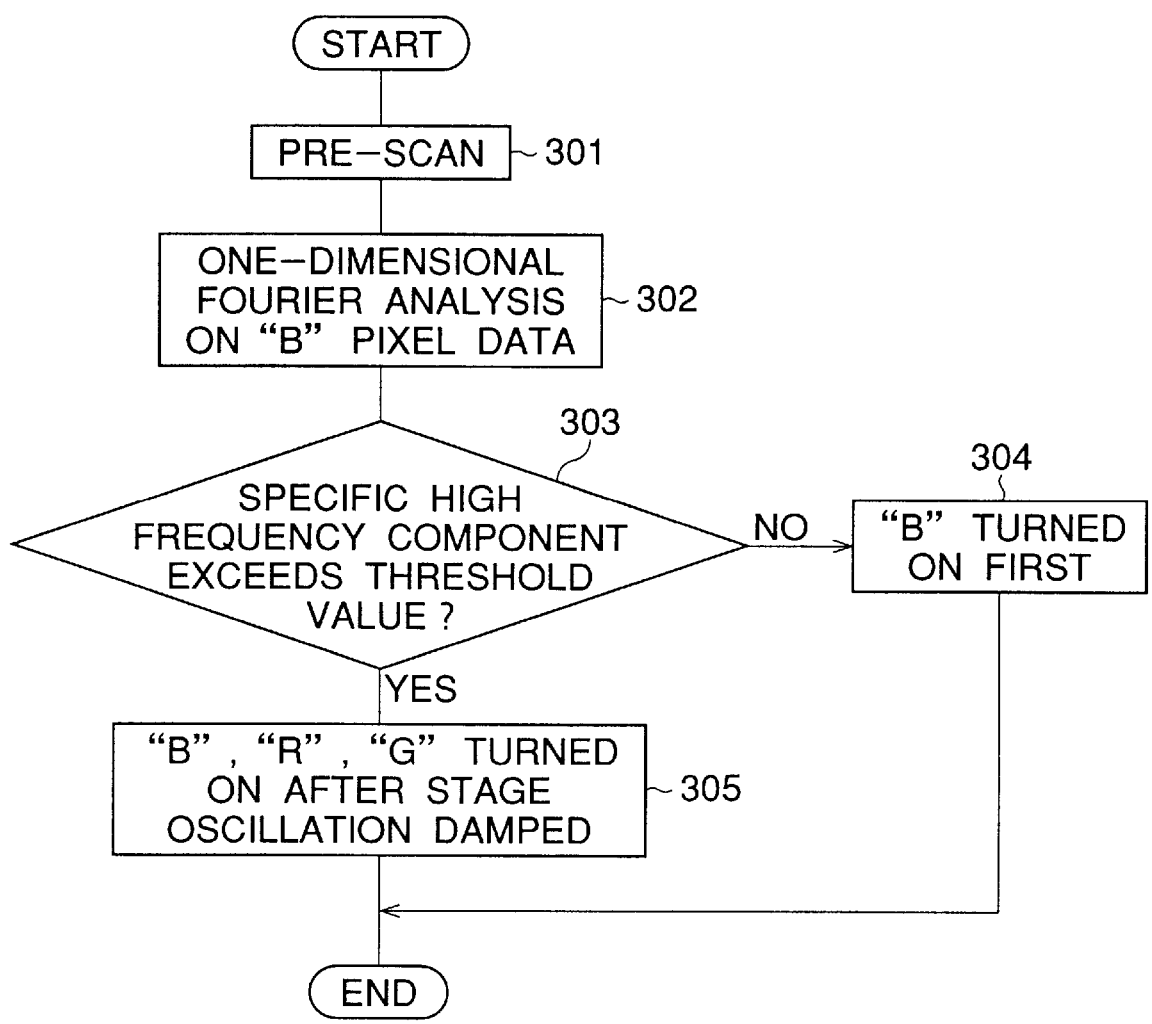
FIG. 9 is a flow chart of a program by which the order, in which the light-emitting diodes are selectively turned ON, is determined in a third embodiment.

FIG. 9 shows a flow chart of a program by which the order, in which the light-emitting diodes 21R, 21G and 21B are selectively turned ON, is determined, in a third embodiment. Note that, in the third embodiment, the construction of the device is the same as that of the first embodiment.

In Step 301, the pre-scanning operation is carried out, so that pixel data are sensed similarly to Step 101 shown in FIG. 7. In Step 302, pixel data corresponding to the center portion of the image is extracted from the B pixel data sensed in Step 301, and a one-dimensional Fourier analysis is performed on the extracted pixel data, so that the amplitude F(k) expressed by equation (1) is obtained.

In Step 303, it is determined whether a specific high spatial frequency component of the B pixel data exceeds a threshold value indicating the influence of the oscillation. When the high spatial frequency component does not exceed the threshold value, the B pixel data is hardly affected by the oscillation. Thus, the process goes to Step 304 in which the light-emitting diodes 21B are turned ON so that the B pixel data is read substantially simultaneously with the stopping operation of the moving mechanism 10, and the program ends. Conversely, when it is determined in Step 303 that the specific high spatial frequency component of the B pixel data exceeds the threshold value, the B pixel data is easily affected by the oscillation. Therefore, Step 305 is executed in which all of the light-emitting diodes 21R, 21G and 21B are turned ON in such a manner that all of the pixel data, including the B pixel data, are read after the oscillation of the stage 12 has been fully damped so that the influence of the oscillation is substantially extinguished. Namely, in the reading operation, after the feeding motor 15 is stopped and then a predetermined period, in which the oscillation would be stopped, has elapsed, the light-emitting diodes 21R, 21G and 21B are turned ON and electric charge accumulation of the line sensor 30 is started.

As described above, in the third embodiment, the B pixel data is read first as often as possible, and further, when the high frequency component of the B pixel data exceeds the threshold value, the pixel data of all the color components are read after the oscillation of the stage 12 is extinguished. Therefore, according to the third embodiment, in addition to the effect obtained by the first embodiment, the deterioration of the quality of the reproduced image is prevented, by using a simple procedure.

Figure 10:
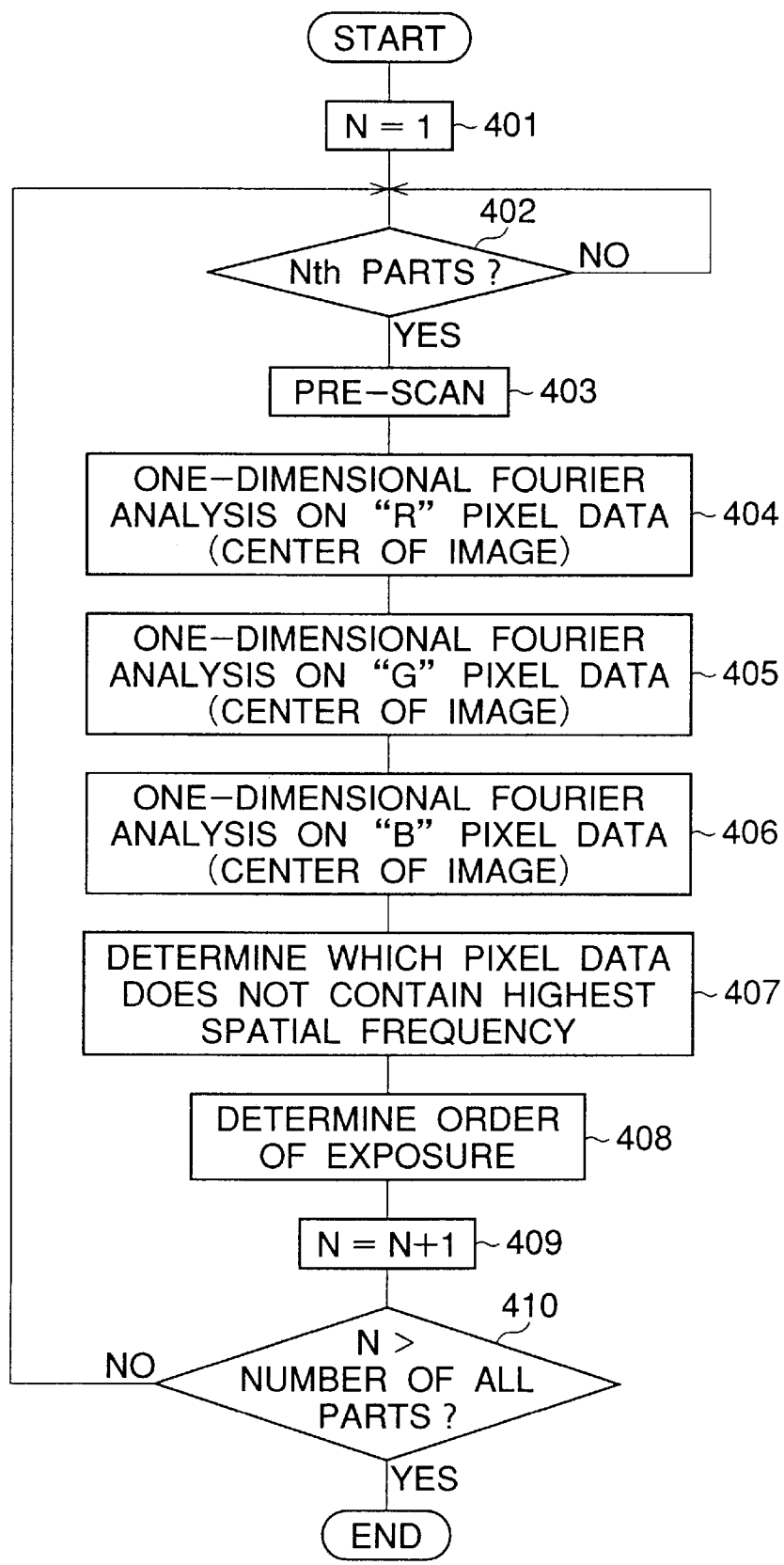
FIG. 10 is a flow chart of a program by which the order, in which the light-emitting diodes are selectively turned ON, is determined in a fourth embodiment.

FIG. 10 shows a flow chart of a program by which the order, in which the light-emitting diodes 21R, 21G and 21B are selectively turned ON, is determined, in a fourth embodiment. Note that, in the fourth embodiment, the construction of the device is the same as that of the first embodiment.

In the fourth embodiment, the color image recorded in the read object M is divided into a plurality of parts by at least one line extending in parallel to the longitudinal direction of the line sensor 30. The order, in which the light-emitting diodes 21R, 21G and 21B are selectively turned ON, is independently derived with respect to each of the parts.

In Step 401, a parameter "N" indicating the parts is set to an initial value "1". When it is confirmed in Step 402 that the stage 12 has been positioned at an end of the Nth part of the color image by the moving mechanism 10, Steps 403 through 408 are executed so that the order of turning ON of the light-emitting diodes 21R, 21G and 21B for the Nth part is determined. The operations in Steps 403 through 408 are the same as those of Steps 101 through 106, and therefore, the explanations thereof are omitted.

In Step 409, the parameter "N" is incremented by one. When it is determined in Step 410 that the parameter "N" does not exceed the number of all of the parts, the process goes back to Step 402, in which the operations described above are again executed. When it is determined in Step 410 that the parameter "N" exceeds the number of all of the parts, the program ends.

Data indicating the order, decided in Step 408, of the turning ON of the light-emitting diodes 21R, 21G and 21B, in the Nth part, is stored in a memory (not shown) provided in the system control circuit 40. In the system control circuit 40, the position of the line sensor 30 is recognized based on the total amount of movement from the initial position. In the image reading operation, the data indicating the order corresponding to the part is read from the memory every time the line sensor 30 reaches the initial position of each part, so that the order of the turning ON is set for each of the parts.

Thus, in the fourth embodiment, since the order of the turning ON of the light-emitting diodes 21R, 21G and 21B is controlled independently for each of the parts of the color image, a proper order of the turning ON can be set for each of the parts, in comparison with the first, second and third embodiments. Therefore, according to the fourth embodiment, in addition to the effect obtained by the first embodiment, the deterioration of the quality of each of the parts of the reproduced image is prevented.

Figure 11:
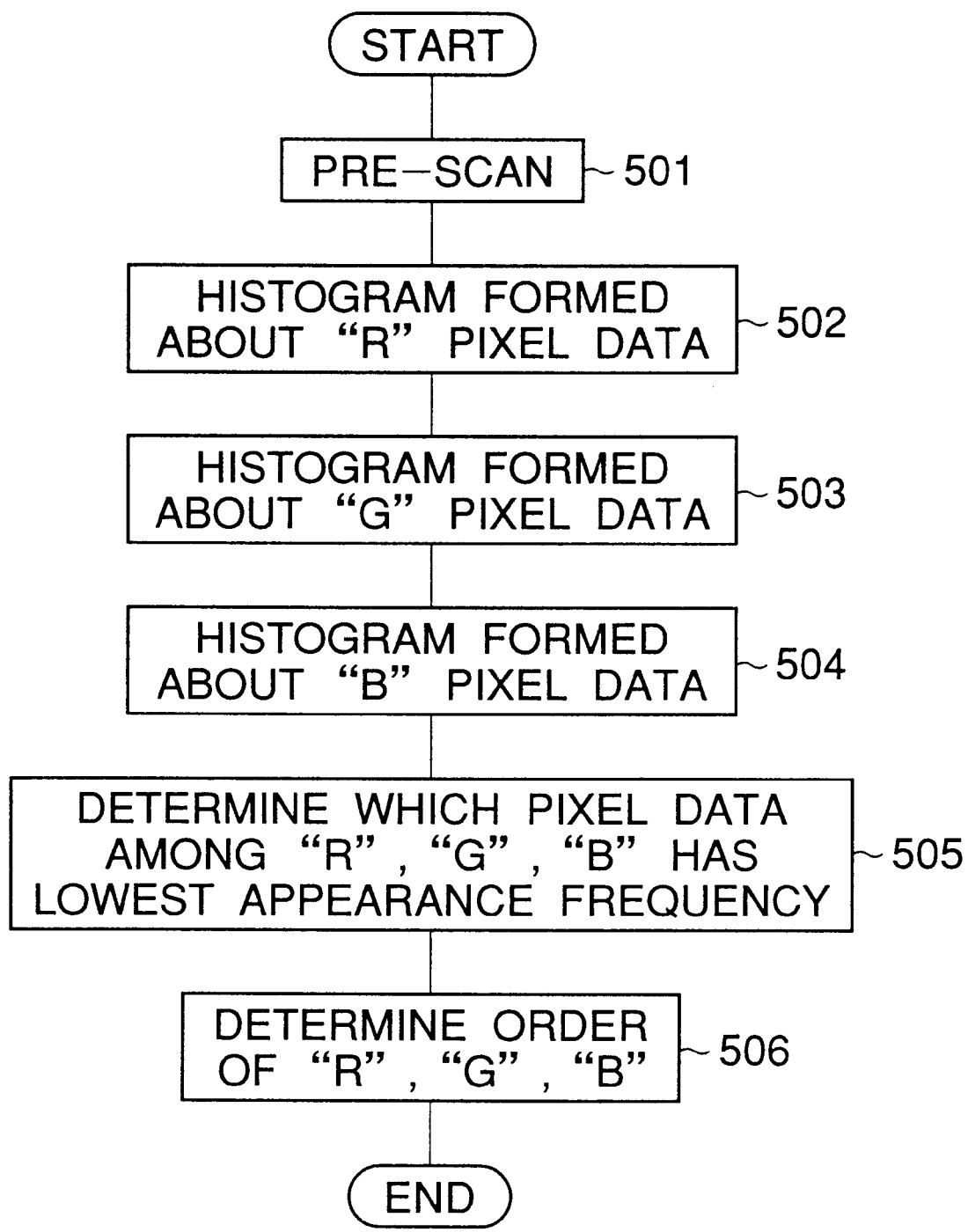
FIG. 11 is a flow chart of a program by which the order, in which the light-emitting diodes are selectively turned ON, is determined in a fifth embodiment.

FIG. 11 shows a flow chart of a program by which the order, in which the light-emitting diodes 21R, 21G and 21B are selectively turned ON, is determined, in a fifth embodiment. Note that, in the fifth embodiment, the construction of the device is the same as that of the first embodiment.

Figure 12:
FIG. 12 is a view showing a histogram of B pixel data, for example, obtained by a pre-scanning operation.

In Step 501, the pre-scanning operation is carried out, similarly to Step 101 shown in FIG. 7, so that pixel data are sensed. In Step 502, pixel data corresponding to the center portion of the image is extracted from the R pixel data sensed in Step 501, and a histogram is formed about the pixel data. This histogram shows a distribution of appearance frequency D(i) of each level of the R pixel data as shown in FIG. 12. In Steps 503 and 504, histograms about the G and B pixel data are obtained similarly to Step 502.

In Step 505, histograms D(i) obtained in Steps 502 through 504 are substituted for the following equation (3):

$$m = \frac{\sum_{i=0}^{255} D(i) \times i}{\sum_{i=0}^{255} D(i)} \qquad (3)$$

so that the arithmetic mean "m" of the histogram D(i) is obtained for each of the R, G and B pixel data. Thereby, it is determined which pixel data among the R, G and B pixel data is most easily affected by the oscillation. In this embodiment, it is determined that, as the value of the arithmetic mean obtained by the equation (3) decreases, the pixel data becomes less affected by the oscillation. Namely, in Step 506, it is determined that the light-emitting diodes 21R, 21G and 21B are turned ON in the order of the smaller to the greater value of the arithmetic mean "m".

Thus, even in the fifth embodiment, in which the histogram is used, the effect, similar to the embodiment in which the spatial frequency is used, is obtained.

Note that two-dimensional analysis can be utilized instead of one-dimensional analysis which is used in the first through fourth embodiments.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-257845 (filed on Sep. 6, 1996) which is expressly incorporated herein by reference, in its entirety.

I claim:

1. An image reading device for performing an image reading operation in which at least one of a line sensor and a recording medium is intermittently moved by a moving mechanism in a direction perpendicular to a longitudinal direction of said line sensor, so that red (R) pixel data, green (G) pixel data and blue (B) pixel data are read at every single line of image pixels included in a color image recorded in said recording medium, said image reading device comprising:
   a pre-scanning processor that controls said moving mechanism, prior to said image reading operation, to pre-scan said color image by said line sensor, whereby R, G and B pixel data are obtained; and
   a controlling processor that controls an order in which said R, G and B pixel data are read in said image reading operation, said controlling processor determining, based on said pixel data obtained by said pre-scanning processor, which pixel data among said R, G and B pixel data is least affected by an oscillation due to a stopping operation during an intermittent movement by said moving mechanism, and controlling said order so that said pixel data, which is least affected by said oscillation, is read substantially simultaneously with said stopping operation.

2. A device according to claim 1, wherein said controlling processor determines, based on said pixel data corresponding to a center portion of said color image, which pixel data among said R, G and B pixel data is least affected by said oscillation.

3. A device according to claim 1, wherein said controlling processor senses a spatial frequency of said R, G and B pixel data obtained by said pre-scanning processor, and determines that pixel data, having a lowest value of said spatial frequency among said R, G and B pixel data, is least affected by said oscillation.

4. A device according to claim 1, wherein said controlling processor controls said order in such a manner that one of said R pixel data and said B pixel data is sensed substantially simultaneously with said stopping operation, when it is determined that said R pixel data, said G pixel data and said B pixel data are approximately equally affected by said oscillation.

5. A device according to claim 4, wherein said G pixel data is sensed after said R pixel data and said B pixel data is sensed.

6. A device according to claim 1, wherein said controlling processor controls said order in such a manner that a predetermined pixel data is sensed substantially simultaneously with said stopping operation, when it is determined, based on a predetermined high frequency component of said predetermined pixel data, that said predetermined pixel data does not exceed a threshold value indicating an effect of said oscillation.

7. A device according to claim 6, wherein said predetermined pixel data is said B pixel data.

8. A device according to claim 6, wherein said controlling processor controls said order in such a manner that said R pixel data, said G pixel data and said B pixel data are sensed after said effect of said oscillation is substantially distinguished, when it is determined that said B pixel data exceeds said threshold value.

9. A device according to claim 1, wherein said controlling processor derives a histogram of said R pixel data, said G pixel data and said B pixel data obtained by said pre-scanning processor, and determines, based on said histogram, which pixel data among said R pixel data, said G pixel data and said B pixel data is least affected by said oscillation.

10. A device according to claim 1, wherein said color image is divided into a plurality of parts by at least one line extending parallel to the longitudinal direction of said optical sensor, and said controlling processor controls said order, whereby said order is independently derived with respect to said plurality of parts.

11. An image reading device for performing an image reading operation in which at least one of a line sensor and a recording medium is intermittently moved by a moving mechanism in a direction perpendicular to a longitudinal direction of said line sensor, so that red (R) pixel data, green (G) pixel data and blue (B) pixel data are read at every single line of image pixels included in a color image recorded in said recording medium, said device comprising:
   a pre-scanning processor that controls said moving mechanism, prior to said image reading operation, to pre-scan said color image by said line sensor, whereby said R pixel data, said G pixel data and said B pixel data are obtained; and
   a controlling processor that controls an order in which said R pixel data, said G pixel data and said B pixel data are read in said image reading operation, said controlling processor determining, based on said pixel data obtained by said pre-scanning processor, which pixel data among said R pixel data, said G pixel data and said B pixel data is least affected by an oscillation due to a stopping operation during an intermittent movement by said moving mechanism, and controlling said order so that said pixel data, which is least affected by said oscillation, is read first in comparison with the other pixel data.

12. An image reading, comprising:
   an optical sensor that optically reads a color image recorded in a recording medium, said optical sensor sensing R pixel data, G pixel data and B pixel data contained in said color image;
   a moving mechanism that intermittently moves one of said optical sensor and said recording medium in a predetermined direction so that said optical sensor reads said R pixel data, said G pixel data and said B pixel data at every single line of image pixels included in said color image;
   a pre-scanning processor that drives said moving mechanism to pre-scan said color image by said optical sensor with a first pitch, whereby said R pixel data, said G pixel data and said B pixel data are obtained;

a scanning processor that drives said moving mechanism to scan said color image by said optical sensor with a second pitch, finer than said first pitch, whereby said R pixel data, said G pixel data and said B pixel data are obtained; and a controlling processor that controls said scanning processor so that said R pixel data, said G pixel data and said B pixel data of said single line of image pixels are read by said optical sensor in a predetermined order, said controlling processor determining, based on said pixel data obtained by said pre-scanning processor, which pixel data among said R pixel data, said G pixel data and said B pixel data is least affected by an oscillation due to a stopping operation during an intermittent movement by said moving mechanism, and controlling said order so that said pixel data, which is least affected by said oscillation, is read substantially simultaneously with said stopping operation.

* * * * *